(12) United States Patent
Cooper et al.

(10) Patent No.: US 9,044,887 B2
(45) Date of Patent: Jun. 2, 2015

(54) METHOD OF FORMING A CONTAINER

(75) Inventors: Robert A. Cooper, Grass Lake, MI (US); Theodore F. Eberle, Ann Arbor, MI (US); G. David Lisch, Jackson, MI (US); Kirk Edward Maki, Tecumseh, MI (US)

(73) Assignee: DISCMA AG, Hunenberg (CH)

( * ) Notice: Subject to any disclaimer, the term of this patent is extended or adjusted under 35 U.S.C. 154(b) by 374 days.

(21) Appl. No.: 13/478,546

(22) Filed: May 23, 2012

(65) Prior Publication Data
US 2012/0299224 A1    Nov. 29, 2012

Related U.S. Application Data

(60) Provisional application No. 61/490,672, filed on May 27, 2011.

(51) Int. Cl.
| | | |
|---|---|---|
| *B29C 49/12* | (2006.01) | |
| *B29C 49/08* | (2006.01) | |
| *B29C 49/46* | (2006.01) | |
| *B29C 49/78* | (2006.01) | |

(Continued)

(52) U.S. Cl.
CPC .......... B29C 49/46 (2013.01); *B29C 2049/4658* (2013.01); B29C 49/12 (2013.01); *B29K 2267/00* (2013.01); *B29K 2995/004* (2013.01); *B29C 49/06* (2013.01); B29C 49/783 (2013.01); *B29C 2049/4664* (2013.01)

(58) Field of Classification Search
CPC ..................... B29C 49/783; B29C 2049/2008; B29C 2049/465; B29C 2049/4652; B29C 2049/4655; B29C 2049/4664; B29C 2049/4658; B29C 49/46

USPC ................. 264/500, 529, 524, 40.3
See application file for complete search history.

(56) References Cited

U.S. PATENT DOCUMENTS

| | | | |
|---|---|---|---|
| 3,251,915 A | * | 5/1966 | Pechthold ...................... 264/524 |
| 3,267,185 A | | 8/1966 | Freeman, Jr. |
| 3,268,635 A | | 8/1966 | Kraus et al. |

(Continued)

FOREIGN PATENT DOCUMENTS

| | | |
|---|---|---|
| EP | 0849514 | 6/1998 |
| EP | 1529620 | 5/2005 |

(Continued)

OTHER PUBLICATIONS

International Search Report and Written Opinion dated Sep. 28, 2012 in corresponding International Patent Application No. PCT/US2012/024954 (six pages).

(Continued)

*Primary Examiner* — Joseph S Del Sole
*Assistant Examiner* — Nahida Sultana
(74) *Attorney, Agent, or Firm* — Harness, Dickey & Pierce, P.L.C.

(57) ABSTRACT

A method of forming a plastic container from a preform. The method comprises injecting a forming liquid into the preform at a predetermined system pressure range, a predetermined flow rate, and a predetermined duration sufficient to create a pressure spike at a peak pressure. The peak pressure being greater than the system pressure to urge the preform into the mold cavity, thus creating enhanced container definition, reduced post mold shrinkage, lower residual material stresses, and/or an improved transfer of the mold geometry and engraving to the final formed container.

26 Claims, 1 Drawing Sheet

(51) Int. Cl.
  *B29K 267/00* (2006.01)
  *B29C 49/06* (2006.01)

(56) References Cited

U.S. PATENT DOCUMENTS

| | | | |
|---|---|---|---|
| 3,358,062 A * | 12/1967 | Lemelson | 264/503 |
| 3,911,071 A * | 10/1975 | Naumann | 264/524 |
| 3,993,427 A | 11/1976 | Kauffman et al. | |
| 4,039,641 A | 8/1977 | Collins | |
| 4,177,239 A | 12/1979 | Gittner et al. | |
| 4,321,938 A | 3/1982 | Siller | |
| 4,423,000 A * | 12/1983 | Teraoka | 264/524 |
| 4,432,720 A | 2/1984 | Wiatt et al. | |
| 4,457,688 A | 7/1984 | Calvert et al. | |
| 4,490,327 A | 12/1984 | Calvert et al. | |
| 4,499,045 A | 2/1985 | Obsomer | |
| 4,539,172 A | 9/1985 | Winchell et al. | |
| 4,540,542 A * | 9/1985 | Weiler | 264/524 |
| 4,707,966 A * | 11/1987 | Weiler et al. | 53/410 |
| 4,725,464 A | 2/1988 | Collette | |
| 4,883,631 A | 11/1989 | Ajmera | |
| 4,935,190 A | 6/1990 | Tennerstedt | |
| 5,129,815 A | 7/1992 | Miyazawa et al. | |
| 5,269,672 A | 12/1993 | DiGangi, Jr. | |
| 5,389,332 A | 2/1995 | Amari et al. | |
| 5,403,538 A | 4/1995 | Maeda | |
| 5,540,879 A | 7/1996 | Orimoto et al. | |
| 5,599,496 A | 2/1997 | Krishnakumar et al. | |
| 5,622,735 A | 4/1997 | Krishnakumar et al. | |
| 5,635,226 A | 6/1997 | Koda et al. | |
| 5,687,550 A | 11/1997 | Hansen et al. | |
| 5,824,237 A | 10/1998 | Stumpf et al. | |
| 5,962,039 A | 10/1999 | Katou et al. | |
| 6,214,282 B1 | 4/2001 | Katou et al. | |
| 6,277,321 B1 | 8/2001 | Vailliencourt et al. | |
| 6,485,670 B1 | 11/2002 | Boyd et al. | |
| 6,502,369 B1 | 1/2003 | Andison et al. | |
| 6,692,684 B1 | 2/2004 | Nantin et al. | |
| 6,729,868 B1 | 5/2004 | Vogel et al. | |
| 6,749,415 B2 | 6/2004 | Boyd et al. | |
| 6,767,197 B2 | 7/2004 | Boyd et al. | |
| 7,141,190 B2 | 11/2006 | Hekal | |
| 7,473,388 B2 * | 1/2009 | Desanaux et al. | 264/524 |
| 7,553,441 B2 | 6/2009 | Shi | |
| 7,914,726 B2 | 3/2011 | Andison et al. | |
| 7,981,356 B2 | 7/2011 | Warner et al. | |
| 8,017,064 B2 | 9/2011 | Andison et al. | |
| 8,096,483 B2 | 1/2012 | Riney | |
| 8,241,552 B2 * | 8/2012 | Augustin et al. | 264/526 |
| 8,864,490 B2 * | 10/2014 | Fevre et al. | 425/524 |
| 2001/0010145 A1 | 8/2001 | Tawa et al. | |
| 2004/0089967 A1 * | 5/2004 | Chatard et al. | 264/84 |
| 2005/0067002 A1 | 3/2005 | Jones | |
| 2005/0206045 A1 | 9/2005 | Desanaux et al. | |
| 2006/0097417 A1 | 5/2006 | Emmer | |
| 2006/0231646 A1 | 10/2006 | Geary, Jr. | |
| 2006/0249887 A1 * | 11/2006 | Maddox | 264/524 |
| 2008/0254160 A1 | 10/2008 | Rousseau et al. | |
| 2008/0271812 A1 | 11/2008 | Stefanello et al. | |
| 2010/0084493 A1 | 4/2010 | Troudt | |
| 2010/0213629 A1 | 8/2010 | Adriansens | |
| 2010/0303946 A1 | 12/2010 | Voth | |
| 2011/0265433 A1 | 11/2011 | Chauvin et al. | |
| 2014/0157723 A1 * | 6/2014 | Feuilloley | 53/127 |

FOREIGN PATENT DOCUMENTS

| | | |
|---|---|---|
| EP | 1577258 | 9/2005 |
| EP | 1688234 | 8/2006 |
| FR | 2887525 | 12/2006 |
| JP | 57123027 | 7/1982 |
| JP | 63-249616 | 10/1988 |
| JP | 09057834 | 3/1997 |
| JP | 09099477 | 4/1997 |
| JP | 10-217258 | 8/1998 |
| JP | 2000-043129 | 2/2000 |
| JP | 2005-254704 | 9/2005 |
| JP | 2005-529002 | 9/2009 |
| KR | 10-0147442 | 8/1998 |
| KR | 2006-0105883 | 10/2006 |
| KR | 10-2006-0128062 | 12/2006 |
| WO | WO02/24435 | 3/2002 |
| WO | WO03/095179 | 11/2003 |
| WO | WO2004/065105 | 8/2004 |
| WO | WO2005/044540 | 5/2005 |
| WO | WO2007/120807 | 10/2007 |

OTHER PUBLICATIONS

International Search Report and Written Opinion dated Apr. 17, 2012 in corresponding International Patent Application No. PCT/US2011/051284 (nine pages).
International Search Report and Written Opinion dated Apr. 18, 2012 in corresponding International Patent Appliation No. PCT/US2011/051289 (nine pages).
International Search Report and Written Opinion dated May 8, 2012 in corresponding International Patent Application No. PCT/US2011/054584 (six pages).
International Search Report and Written Opinion dated May 9, 2012 in corresponding International Patent Application No. PCT/US2011/056053 (six pages).
International Search Report and Written Opinion dated May 30, 2012 in corresponding International Patent Application No. PCT/US2011/056057 (six pages).
International Search Report and Written Opinion dated Jun. 15, 2012 in corresponding International Patent Application No. PCT/US2011/051293 (eight pages).
International Search Report and Written Opinion dated Jan. 3, 2013 in corresponding International Patent Application No. PCT/US2012/039420 (eight pages).
International Search Report and Written Opinion dated Oct. 29, 2012 in corresponding International Patent Application No. PCT/US2012/024950 (seven pages).

* cited by examiner

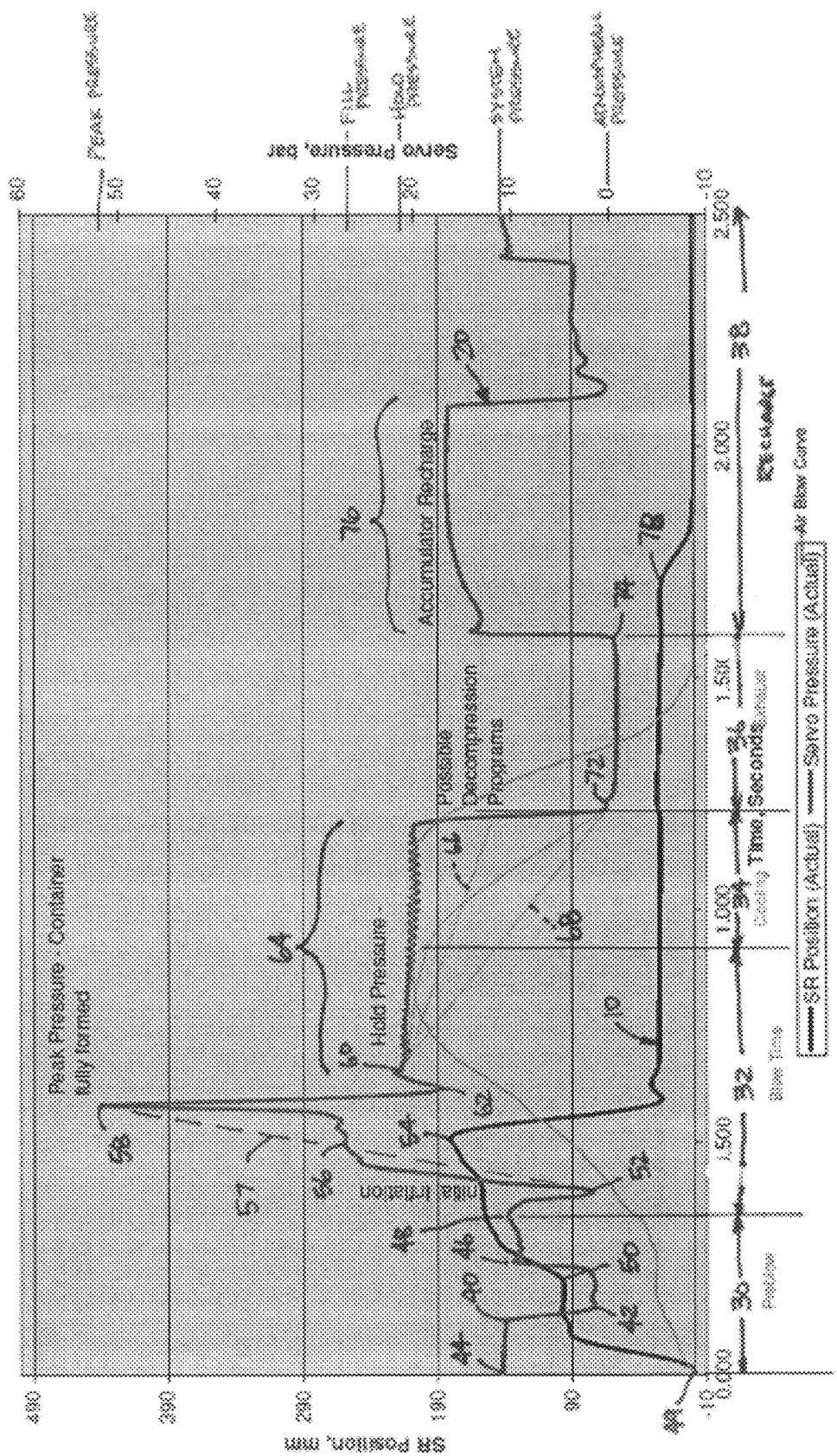

METHOD OF FORMING A CONTAINER

CROSS-REFERENCE TO RELATED APPLICATIONS

This application claims the benefit of U.S. Provisional Application No. 61/490,672, filed on May 27, 2011. The entire disclosure of the above application is incorporated herein by reference.

FIELD

This disclosure generally relates to forming a container for retaining a commodity, such as a solid or liquid commodity. More specifically, this disclosure relates to a method of forming a container using, at least in part, a liquid pressure pulse to finally shape and optionally filling the plastic container.

BACKGROUND

This section provides background information related to the present disclosure which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

SUMMARY

This section provides a general summary of the disclosure, and is not a comprehensive disclosure of its full scope or all of its features.

According to the principles of the present disclosure, a method of forming a plastic container from a preform is provided. The method comprises injecting a forming liquid into the preform at a predetermined system pressure, a predetermined flow rate, and a predetermined duration sufficient to form the container and also create a pressure spike at a peak pressure. The peak pressure being greater than the system pressure to urge the preform into the mold cavity, thus creating enhanced container definition, reduced post mold shrinkage, lower residual material stresses, and/or an improved transfer of the mold geometry and engraving to the final formed container.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a graph illustrating the method according to the principles of the present teachings.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Introduction

Generally, the present teachings provide a method of forming and optionally filling a container from a preform to a final container in a single step. Unlike traditional container manufacturing techniques that generally include injection molding a preform, blow-molding a container from the preform, and then filling the resultant container with a commodity at a separate machine, the present teachings, in some embodiments, combine the forming and filling of the container in a single, collective process by using the liquid product or commodity as the forming liquid. This process results in an increased forming pressure that leads to several desirable effects in the container forming process, which will be discussed herein.

A typical air blow-molding system gradually fills the preform with air (commonly called preblow) to pre-inflate the preform. The typical system then increases the air pressure to the full system pressure, usually between 350 psi to 650 psi. The pressure within the preform and eventually the resultant container increases to approximately the full system pressure, then drops slightly as the preform expands within the mold cavity until finally the air pressure within the partially formed container gradually builds back up to approximately full system pressure. The pressure within the resultant container is then released for removal or air circulation for cooling. It should be recognized that the maximum attainable forming pressure of the typical air blow-molding system is limited to the supplied full system pressure. Therefore, in order to increase the forming pressure of the typical air blow-molding system, one would need to increase the size and capacity of the machinery used at an associated cost increase.

As will be discussed in detail, by utilizing liquid to form a container according to the principles of the present teachings, the liquid itself creates a pressure spike or hydraulic shock during the final forming of the plastic container that is much higher than the applied full system pressure causing the container to more fully seat against the mold walls. This pressure spike, water hammer effect, or hydraulic pressure shock is equally distributed throughout the container, thus creating enhanced container definition, reduced post mold shrinkage, lower residual material stresses, and an improved transfer of the mold geometry and engraving to the final formed container.

For purposes of the present discussion, it should be understood that generally "water hammer effect" (or, more generally, fluid hammer) is a pressure surge or wave resulting when a fluid (usually a liquid but sometimes also a gas) in motion is forced to stop or change direction suddenly (momentum change). Water hammer can occur when a valve is closed suddenly at an end of a pipeline system, and a pressure wave propagates in the pipe. It may also be known as hydraulic shock. Similarly, "hydraulic shock" is the term used to describe the momentary pressure rise in a piping system which results when the liquid is started or stopped quickly. This pressure rise is caused by the momentum of the fluid; therefore, the pressure rise increases with the velocity of the liquid, the length of the system from the fluid source, or with an increase in the speed with which it is started or stopped. Finally, a pressure surge or spike can be defined as a sudden, usually short-duration, increase in pressure. However, it should be understood that these terms may be used interchangeably in connection with the present discussion.

The method of the present teachings teaches filling the preform with liquid in such a way that the internal pressure builds to a peak pressure much higher than that of typical air blow-molding systems. The liquid flow rate, over a predetermined time, such as, but not limited to about 0.05-1.5 second (or more particularly about 0.1-0.3 seconds), causes the preform to be urged into the mold forming walls. The mass of the liquid, flow rate and flow duration collectively result in a water hammer effect that produces a pressure spike that is, in some embodiments, at least 5%, more preferably about 20% to 70%, higher (or more) than the subsequent holding pressure (60). That is, the natural momentum of the fluid during the forming process produces a pressure that is greater than that simply produced by the machinery. Therefore, increased pressure can be attained without the need for increased machinery sizes and without the associated increased costs. It should be understood that the pressure spike, water hammer effect, or hydraulic shock is proportional to the mass of the liquid or commodity used times the velocity of the liquid or commodity.

In some embodiments of the present teachings, this hydraulic shock can be controlled by varying the amount of liquid injected into the preform and/or varying the flow rate of the injection (i.e. velocity). According to the principles of the present teachings, it is advantageous to use this pressure spike to help fully form the container and provide additional detail not possible with standard air pressure blowing systems and/or current high pressure air systems used in high production blow-molding.

According to the principles of the present teachings, after the hydraulic shock described herein occurs, the pressure contained within the system and the resultant container stabilizes close to a predetermined peak system pressure which, in some embodiments, can range from about 218 psi to about 1088 psi (about 15 to about 75 bar). In some embodiments, the system holds this pressure until the container hardens into its final shape. The pressure is then released and the container ejected, in some embodiment fully filled with product, before transferring to the next station for capping.

By using liquid to form the container, and generating the hydraulic shock, the resultant spike in pressure fully forms the container and produces significant improvements in product definition and detail. This results in a reduction in post mold shrinkage of at least 10-40%. This process varies from traditional methods that only regulate the pressure of the fluid used to form the container and the time to which it is applied. These teachings not only control the pressure and time, but also the velocity or rate at which the container is formed and the resulting pressure spike generated from that velocity. By controlling not only the time and pressure of the container formation, but also the velocity, this effectively manages the viscosity, strain induced crystallinity, and material distribution of the plastic during formation, which is known to control quality in plastic.

The hydraulic shock of the present teachings differs from the air blown process, because the mass of the air is not high enough to create this sudden "shock" or "hammer effect" in the final container. The injected liquid fills the volume and then the pressure surges as the volume becomes fixed by virtue of the mold cavity. The momentum of the injected liquid leads to the pressure spike due to the incompressible nature of the liquid. The pressure curve increases until it overcomes the final resistance of the container material and the material modulus to move the material into the final portions of the mold.

Forming Process

Variations of the forming process are anticipated; therefore, the following is a discussion of alternatives, variations, and the current best mode of practice of the present teachings. It should, however, not be used to limit the teachings of the present disclosure.

Briefly, the container can be formed according to the principles of the present teachings. A preform version of container can include a support ring, which may be used to carry or orient the preform through and at various stages of manufacture. For example, the preform may be carried by the support ring, the support ring may be used to aid in positioning the preform in a mold cavity. At the outset, the preform may be placed into the mold cavity such that the support ring is captured at an upper end of the mold cavity. In general, the mold cavity has an interior surface corresponding to a desired outer profile of the blown container.

With reference to FIG. 1, an exemplary graph is provided illustrating the stretch rod position 10 (SR Position) in millimeters and servo pressure 20 (Servo Pressure) in bar versus elapsed time in seconds. This figure further illustrates that the process of the present teachings can be generally divided into a System Pressure Segment 30, a Forming and Filling Segment 32, a Cooling Segment 34, an Exhaust Segment 36, and a Recharge Segment 38.

During the System Pressure Segment 30, the preform is supplied and a blow head moves down into position over the preform to define a nozzle seal. During this segment, in some embodiments, a low pressure system, having a system pressure of about 150 psi (10.3 bar), is supplied to the blow head. More particularly, a minimum system pressure of about 20 psi (1.4 bar) to about 90 psi (5.2-6.2 bar). The blow head moves down and engages the preform at point 40, resulting in an initial decrease of the servo pressure 20 to point 42. Once volume within the preform is compensated for and/or the preform is filled with initial fluid, the servo pressure 20 builds again to generally equal the system pressure 44 at point 46.

During this segment, in some embodiments, the stretch rod is initially inserted into the preform (by virtue of the positioning going from an exemplary −10 mm position to a 100 mm position) at point 49. The stretch rod is then extended, following the moving down of the blow head and the initial decrease of the servo pressure 20 at 42, at point 52. In some embodiments, this has the effect of displacing residual air in the preform, thereby decreasing the amount of air entrapped in the final filled container.

It should be recognized that variations in System Pressure Segment 30 can exist. For example, in some embodiments, a low-pressure variation can be used wherein a different blow head nozzle configuration can be used that does not affect system pressure when blow nozzle actuates downward to seal against the preform. Conversely, a high-pressure variation can be used wherein high pressure is generated by means of a pump, screw device, or other high pressure generation device within a wheel assembly package and rotates with the blow heads. Alternatively, in some embodiments, high pressure can be generated by means of a pump, screw device, or other high pressure generation device outside of the wheel assembly and routed through the rotary union at high pressure. It should be recognized that, in some embodiments, a linear or shuttle type blow molding machine can be used in place of the aforementioned rotary union device. Each of these high pressure systems can be used with a low pressure blow nozzle configuration.

In some embodiments, the environment surrounding this processing system can be positively charged with $N_2$ gas to improve shelf life of the packaged product by eliminating oxygen within the container during forming and filling. Alternatively, the environment surrounding this processing system can be positively charged with $CO_2$ gas to improve carbonation of the packaged product. It should be recognized that other gases can be used in this positive-pressure environment.

During the Forming and Filling Segment 32, a seal pin is opened at point 48 to permit the application of system liquid, used for displacement, into the preform to begin shaping the preform. This results in an initial pressure drop from point 48 to point 52. The stretch rod is actuated, contacts the preform, and extends from point 50 to point 54, thereby extending and elongating the preform. The stretch rod travel, pressure, and velocity are servo-controlled, pneumatic-controlled, mechanically-controlled, cam-controlled, or the like, and the stretch rod actuation system is not pressure limited, therefore the mechanical pressure applied by the stretch rod can be whatever is required to maintain the velocity or flow rate of the liquid being injected. In some embodiments, a stretch rod velocity of 100-1800 mm/sec can be used, with a preferred range of about 1200-1800 mm/sec. However, it should be appreciated that with variable control, a near infinite number of stretch rod velocity settings are available.

As volume displacement of the preform increases, internal pressure within the preform is also increased causing formation and stretching of the preform to begin. This pressure, displacement, and velocity of the liquid is created and controlled by an electric servo motor actuator. The liquid pressure system is not pressure limited, so the pressure applied is whatever is required to maintain the velocity or flow. In some embodiments, the liquid flow rate can be about 1 liter per second to about 10 liters per second, with a preferred range of about 3 liters per second to about 6 liters per second. However, it should be appreciate that with variable control, a near infinite number of flow rates and/or velocities can be achieved.

When the stretch rod movement is maximized at point 54, the gross formation of the hybrid preform-container is complete and the packing of the hybrid preform-container begins. To this end, as the system reaches maximum velocity there is a decelerated increase of internal pressure at about point 56 until full formation of the container occurs at which point the resistance of the blow mold results in another acceleration in pressure increase to a maximum pressure spike at point 58. In an alternative embodiment, particularly when forming smaller size containers, the system may not reach full velocity prior to final formation of the container causing a minimization of the deceleration at about point 56. In other words, a steep and substantially consistent acceleration (substantially straight slope along line 57 (e.g. pressure profile curve or line)) of pressure may occur from point 52 to point 58. The total inflation of the preform generally occurs between points 52 and 58. However, in some embodiments, the pressure spike between about points 56 and 58 cause the hybrid preform-container to fully seat within the mold cavity, thereby achieving the benefits of the present teachings.

When forming a container with an incompressible fluid, particularly when the fluid is below the glass transition temperature of the plastic material, the fluid becomes a significant heat sink that can quickly cool the preform wall and compromise the ability to expand the preform into a fully formed container. Therefore, it is critical to the full formation of containers and minimization of cycle time to reduce the forming time to the least amount of time as possible. Therefore, the invention proposes maximizing the acceleration of pressure from points 52 to point 58 (along pressure profile line 57) in the shortest possible amount of time. Preferably, the average rate of pressure acceleration from point 52 to point 58 (as denoted by the dotted line 57) will be from about 400 psi/sec to about 15,000 psi/sec. More preferably from about 1,000 psi/sec to about 8,000 psi/sec, and more preferably from about 2,000 psi/sec to about 5,000 psi/sec.

Following the pressure spike at point 58, pressure is allowed to decrease as flowrate is ceased. This can be regarded as a "pack and hold" stage, wherein the pack sequence is the pressure spike above fill pressure that completely packs the preform material into the mold cavity. Generally, by way of example, this can result in a pressure spike in the range of about 200-1400 psi, with a preferred range of about 300-800 psi.

Pressure decreases generally to a holding pressure at point 60 to immediately begin a hold sequence. The pressure spike is generally from about 5%, more preferably from about 20% to about 70% above that of the holding pressure 60. The container will be stabilized at a holding pressure which is less than the pressure spike but substantially above minimum system pressure for a time period from about 0.1 seconds to about 1.5 seconds. A pressure trough at point 62 may result depending upon the rate of decompression. In some embodiments, during the holding sequence denoted by time period 64, which is generally a constant pressure, the container is held against the mold cavity until it hardens into shape and cools. There may be pressure oscillations during this period due to hydraulic shock and PID correction and/or pressure and position target set point oscillations due to servo control.

In some embodiments, alternative decompression profiles, such as those denoted by 66 and 68, can be used. These alternative decompression profiles can be used for processing carbonated liquids, or other liquids, that requires a decompression sequence to aid in processing. The system is then brought down to atmosphere pressure during the Exhaust Segment 36 at point 72.

It should be noted that during this holding pressure time period 64, cooling of the container (i.e. Cooling Segment 34) occurs.

During or prior to the holding sequence 64, the optional stretch rod can be further retracted at point 70. In some embodiments, the stretch rod may remain partially within the container such that at a later point, full retraction of the stretch rod results in a headspace within the container equal to the displaced volume of the stretch rod.

As with other segments, variations exist that can be used in connection with the present teachings. Specifically, for example, in some embodiments, the mold can be cold or hot and, likewise, the liquid commodity can be cold or hot. Differing temperatures of the mold and liquid can alter the mechanical properties of the end container creating higher or lower crystallinity, physical properties, mechanical properties, and/or barrier properties. Furthermore, differing temperatures may also allow further stretching, beyond current means, enabling more complex shapes, wider processing windows, greater material selection possibilities, and more flexibility in process set points.

Moreover, additional variations are anticipated. Specifically, in some embodiments, the system can prefill the preform, using either low or high pressure, to a specified volume. Additionally, in some embodiments, the stretch rod can be controlled by cams, air, or can be eliminated altogether.

It should be understood that the pressure and/or peak pressure, displacement of the liquid, and the velocity of injection can all be controlled via alternate means, such as valves, regulators, variable controlled valve, and the like. Moreover, in some embodiments, the method of the present teachings can be sufficient to fully form threads (which are currently molded into the preform) and other in mold detail including, but not limited to, engraving, embossing, texturing, text, graphics, threads, snap features, undercuts, and the like.

Still further, it should be understood that the hold pressure can be reduced, eliminated, or amplified through the use of accumulators, larger cylinders (more mass of liquid to generate speed), or alternate means. Additionally, peak pressure can be increased and cycle times increased so as to create product sterilization by means or similar method to a "French Press". Alternatively, the container can filled at relatively low pressures, then have the base actuated (overstroke, Powerflex, etc) to create the hydraulic "packing" effect, and held during the hold sequence for container shape to solidify.

Following the Cooling Segment 34 and Exhaust Segment 36, the sealing pin is closed at point 74 and the blow head nozzle is retracted. This permits the fill cylinder(s) to refill with liquid commodity for the next cycle at about the system pressure at period 76. During this period, the stretch rod is fully retracted prior to the next cycle at point 78. A recirculation valve can be opened to circulate product for sterility and gradually return to the system pressure.

Alternatively, however, a high pressure system can be used that maintains part or the entire liquid system under a pressure that could eliminate the need to regenerate. Flow can be controlled with variable flow control valves, regulators and the like. Moreover, in some embodiments, the liquid commodity can be replaced with merely a forming liquid (not a final commodity liquid) to achieve the container benefits of the present teachings, without the need to form the container using the final product.

As a result of the present teachings, a container is formed from a preform having the enumerated benefits and advantages. As should be appreciated, the shape of the container formed in connection with the present teachings can be any one of a number of variations. By way of non-limiting example, the container of the present disclosure can be configured to hold any one of a plurality of commodities, such as beverages, food, or other materials.

Alternatively, other conventional materials including, for example, thermoplastic, high density polyethylene, polypropylene, polyethylene naphthalate (PEN), a PET/PEN blend or copolymer, ABS, PVC, PP, PET, PETG, HDPE, LDPE, PC, COC, COP, EVOH, PLA, PBT, PEN, PGA, Polyesters (PET, PLA, PGA, PBT, PEN) PGA PLA>PET>PBT, PEN, Polyamides (PA-6, PA-6,6, PA-MXD6), Polyolefin (PP, PE, COC/COP) and various multilayer structures or other structures, may be suitable for the manufacture of plastic container and used in connection with the principles of the present teachings.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method of forming a plastic container from a preform, the method comprising:
   injecting a forming liquid into the preform at a predetermined system pressure range, a predetermined flow rate range, and for a first predetermined duration range sufficient to create a hydraulic shock and a pressure spike at a peak pressure as a result of the hydraulic shock, said peak pressure being greater than said system pressure range and urging the preform into a mold cavity to form the plastic container; and
   maintaining a holding pressure within the plastic container for a second predetermined duration range after said injecting a forming liquid, said holding pressure being less than said peak pressure.

2. The method according to claim 1 wherein said peak pressure is at least 20% greater than said predetermined system pressure range.

3. The method according to claim 1 wherein the peak pressure is in the range of about 400-1400 psi.

4. The method according to claim 1 wherein the peak pressure is in the range of about 500-800 psi.

5. The method according to claim 1 wherein the predetermined system pressure range is in the range of about 20-150 psi.

6. The method according to claim 1 wherein the predetermined system pressure range is in the range of about 75-90 psi.

7. The method according to claim 1, further comprising:
   actuating a stretch rod engaging the preform that exerts a stretching force upon the preform at least prior to said pressure spike.

8. The method according to claim 1 wherein said forming liquid is a liquid commodity that remains in the plastic container.

9. The method according to claim 1, further comprising:
   using a nozzle outlet connected to the preform and a seal pin between a pressurized liquid source and the nozzle outlet, wherein the injecting a forming liquid into the preform includes opening the seal in and wherein said holding pressure is greater than the system pressure range before said opening the seal pin.

10. The method according to claim 1, further comprising:
    reducing from the holding pressure within the plastic container to a decompression pressure according to a predetermined profile, said holding pressure being greater than said system pressure range and less than said peak pressure.

11. The method according to claim 10 wherein said decompression pressure is equal to about atmospheric pressure.

12. The method according to claim 1, further comprising:
    a cooling sequence following said injecting a forming liquid, said cooling sequence being at a pressure and for the second predetermined duration range sufficient to permit cooling of the plastic container.

13. The method according to claim 12 wherein said second predetermined duration range of said cooling sequence is sufficient to alter the crystallinity, physical properties, mechanical properties, or barrier properties of the plastic container.

14. A method of forming a plastic container from a preform, the method comprising:
    pressurizing a system with fluid to a first predetermined system pressure;
    forming and filling the container with said fluid to create a hydraulic shock and at a second predetermined system pressure wherein said fluid is urged into said container thereby forming said container against a mold cavity;
    maintaining said second predetermined system pressure constant for a duration sufficient to harden and cool the container; and
    depressurizing said system from said second predetermined system pressure to said first predetermined system pressure;
    wherein said second predetermined system pressure is created in response to the hydraulic shock.

15. The method according to claim 14 wherein said second predetermined system pressure is greater than said first predetermined system pressure.

16. The method according to claim 14 wherein said second predetermined system pressure momentarily spikes to peak pressure at least 20% greater than said first predetermined system pressure when said container contacts said mold cavity.

17. A method of forming a plastic container from a preform, the method comprising:
    injecting a forming liquid into the preform at a predetermined system pressure range, a predetermined flow rate range, and for a first predetermined duration range sufficient to create a hydraulic shock and a pressure spike at a peak pressure as a result of the hydraulic shock, said peak pressure being greater than said system pressure range and urging the preform into a mold cavity to form the plastic container, said injecting of said forming liquid and said resulting pressure spike defining a pressure profile curve having a predetermined pressure increase rate; and maintaining a holding pressure within the plastic container for a second predetermined duration range after said injecting a forming liquid, said holding pressure being less than said peak pressure.

18. The method according to claim 17 wherein said predetermined pressure increase rate increase is in the range of about 400 psi per second to about 15,000 psi per second.

19. The method according to claim 17 wherein said predetermined pressure increase rate increase is in the range of about 1,000 psi per second to about 8,000 psi per second.

20. The method according to claim 17 wherein said predetermined pressure increase rate increase is in the range of about 2,000 psi per second to about 5,000 psi per second.

21. The method according to claim 17 wherein said pressure spike increases from about atmospheric pressure to said peak pressure at said predetermined pressure increase rate in the range of about 400 psi per second to about 15,000 psi per second.

22. The method according to claim 17 wherein said pressure spike increases from about atmospheric pressure to said peak pressure at said predetermined pressure increase rate in the range of about 1,000 psi per second to about 8,000 psi per second.

23. The method according to claim 17 wherein said pressure spike increases from about atmospheric pressure to said peak pressure at said predetermined pressure increase rate in the range of about 2,000 psi per second to about 5,000 psi per second.

24. The method according to claim 17, further comprising:
using a nozzle outlet connected to the preform and a seal pin between a pressurized liquid source and the nozzle outlet, wherein the injecting a forming liquid into the preform includes opening the seal in and wherein said holding pressure is greater than the system pressure range before said opening the seal pin.

25. The method according to claim 17 wherein said second predetermined duration range is 0.1 seconds to 1.5 seconds.

26. The method according to claim 17, further comprising:
reducing from the holding pressure within the plastic container to a decompression pressure according to a predetermined profile, said holding pressure being greater than said system pressure range and less than said peak pressure.

* * * * *